Aug. 2, 1960 E. SCHNITZER 2,947,386
BAND PASS SHOCK ABSORBERS WITH SNUBBERS
Filed Sept. 27, 1957 3 Sheets-Sheet 1

INVENTOR
EMANUEL SCHNITZER

BY
ATTORNEYS

Aug. 2, 1960  E. SCHNITZER  2,947,386
BAND PASS SHOCK ABSORBERS WITH SNUBBERS
Filed Sept. 27, 1957  3 Sheets-Sheet 2

INVENTOR
EMANUEL SCHNITZER
BY
ATTORNEYS

INVENTOR
EMANUEL SCHNITZER

United States Patent Office 2,947,386
Patented Aug. 2, 1960

2,947,386

BAND PASS SHOCK ABSORBERS WITH SNUBBERS

Emanuel Schnitzer, 822 19th Place, Newport News, Va.

Filed Sept. 27, 1957, Ser. No. 686,800

6 Claims. (Cl. 188—88)

(Granted under Title 35, U.S. Code (1952), sec. 266)

The invention described herein may be manufactured and used by or for the Government of the United States of America for governmental purposes without the payment of any royalties thereon or therefor.

This invention relates to band pass shock absorbers with special reference to the application of frequency or rate selective snubbers. In my copending application, Serial No. 528,563, filed August 15, 1955, now U.S. Patent No. 2,866,633, issued December 30, 1958, of which this application is a continuation-in-part, there is employed two coacting shock struts for machine elements in the form of telescoping hollow cylinders, the inner cylinder having a closed end serving as a piston for compressing fluids in the receiving cylinder, there being an orifice in the piston head serving to restrict interflow of fluids and thereby absorb shock between the machine elements. The shock absorber therein described is provided with a time delay unit for control of fluid flow which operates to maintain a constant piston orifice area during the slow application of a compressive force upon the shock absorber, with a corresponding slow increase of fluid pressure upon one side of the piston thereof, within a preselected range of low rates of force application with respect to time. When the rate of application of force exceeds the preselected range of low rates, this control unit operates to enlarge the piston orifice area to permit increased fluid flow through the piston and thereby lower the magnitude of the load developed and transmitted by the shock absorber. During cyclic loading of the shock absorber, which may, for example, exhibit a sinusoidal wave form, it is well known in the art that, for a given developed load magnitude, which may be the shock absorber design load, the rate of application of compressive force upon the shock absorber is directly proportional to the circular frequency of loading oscillation. The shock absorber, being sensitive to different ranges of rates of application of force, is therefore capable of discriminating between different ranges of loading frequencies. A typical shock absorber of this type may be designed for a load frequency spectrum of, say, 1 to 20 cycles per second, and the lower end of this frequency spectrum between, for example, 1 to 5 cycles per second, is in effect filtered out by the shock absorber. While such filtering means are, in general, adequate, for some uses it is desirable that, for certain rates or frequencies of force application, such as at the lower end of the frequency spectrum, snubbing forces be applied during shock absorber re-extension, other rates or frequencies being unaffected.

It is, therefore, a primary object of the invention to provide snubbing devices for selected pulse rates or frequencies in a frequency selective shock absorber. An object also is to provide a force rate selective snubbing mechanism for application on re-extension of the shock absorber after compression in shock absorption. Additional objects are to prevent rapid bottoming of the shock strut with high frequency pulse loads and to eliminate, as far as possible, the use of conventional check valve snubber devices.

Other objects and many of the attendant advantages of this invention will be readily appreciated as the same becomes better understood by reference to the following detailed description when considered in connection with the accompanying drawings wherein.

Figure 1:
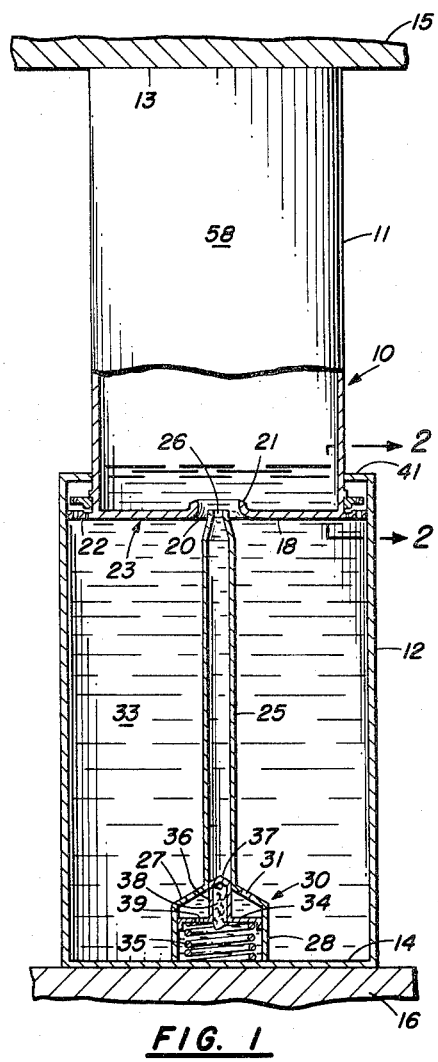
Fig. 1 is an elevation, partly in section of one form of a pulse rate or frequency sensitive shock absorber with the snubbing mechanism incorporated therein.

As described more fully in my copending application hereinabove referred to, the shock absorber 10 of Fig. 1 is of the plunger type including two telescoping hollow cylinders 11 and 12, which may be referred to as piston and receiver, attached at outer ends 13 and 14, respectively, to machine elements 15 and 16, which may be the body and wheel of an airplane. The inner end 18 of the piston cylinder 11 is centrally apertured in an orifice 20 having a reversely curved annular flange 21 which projects into cylinder 11. End 18 is also extended at the cylinder edge to form a circular projecting flange 22 which combines with cylinder end 18 to form the shock absorber piston head 23, slidably movable along the inner wall of receiver cylinder 12.

A hollow plunger, or pin 25 is enclosed in cylinder 12, along the cylinder axis, the top end being open at 26 and an annular orifice 20 formed between the orifice edge 21 and the outside of pin 25. The outer diameter of pin 25 is varied along the length as desired to program this annular orifice area as a function of strut telescoping displacement. The bottom of the pin near the base plate 14 of cylinder 12 is provided with a tapered peripheral flange 27 which bridges the area between the pin bottom and the upper cylindrical wall 28 of a control unit 30. Flange 27 is provided with a series of radial openings 31 permitting fluid communication between region 33, in cylinder 12, and the interior of the control unit 30. Inside the cylinder 28, a valve disk 34 is mounted for up and down movement, a coil spring 35 supporting the piston and tending to move it upwardly. Upward movement of the disk is restrained by a tube 36 placed above and centrally on the disk 34, the tube having a diameter such that the closed top end 37 thereof fits into and closes the open bottom end of pin 25. The bottom end of tube 36 is open and the tube is filled with a nonsaturable compressible material 38, such as sponge rubber for a purpose to be hereinafter described. One or more bleed orifices 39 are formed in valve disk 34. The total area of bleed orifices 39 is only a small fraction of the area of opening 26, and of the total area of openings 31.

Figure 2:
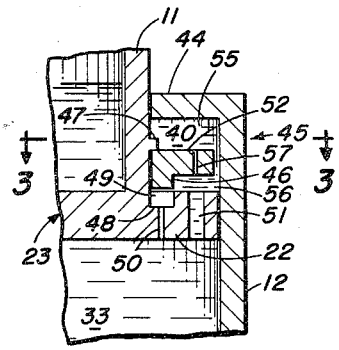
Fig. 2 is an elevational detail taken along lines 2—2 of Fig. 1 showing the snubbing mechanism enlarged.
Figure 3:
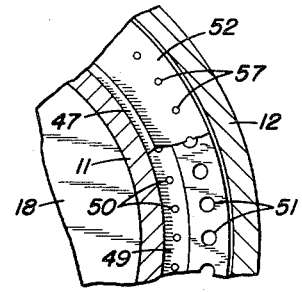
Fig. 3 is a plan view taken along lines 3—3 of Fig. 2 showing the high and low frequency return orifices.

The snubber mechanism 45 is mounted in a chamber 40 formed between the side walls of the piston and receiver cylinders 11 and 12 and the piston flange 22 below, and an inwardly projecting flange 44 at the top end, of the receiver cylinder. As shown more clearly in Fig. 2, the snubber 45 includes a vertically sliding ring 46, movable on piston cylinder 11 between a stop 47 on the piston wall and the base 48 of an annular groove 49, formed on piston flange 22. The radial width of groove 49 is such that ring fits snugly therein, and the groove depth and relative position of stop 47 is such that on upward movement of ring 46, the ring base clears the top edge of the groove to permit fluid flow into the groove. Bleed orifices 50, spaced along the groove base, connect the groove to cylinder region 33, and a series of large holes 51, which may be termed high frequency return orifices, are spaced around the edge of the main piston flange 22, these holes communicating between the region 33 of the cylinder 12 and snubber chamber 40. In effect, this structure is that of an annular dash-pot, with the groove 49 forming the cylinder, the ring 46 the piston, and the bleed orifices 50 the time delay means.

Ring 46, on its upper area, carries a radial rim 52 which extends toward, but is displaced from, the inner wall of cylinder 12 inside chamber 40, thus defining an edge passageway between chamber spaces 55 and 56. A series of bleed ducts 57 are also formed around the rim, communicating between chamber spaces 55 and 56.

A pressure transmitting fluid, such as oil fills the receiver cylinder 12 and also, the piston cylinder 11 to a level sufficient to cover the main orifice 20, the region 58 above the liquid in cylinder 11, being gas filled, as with air.

In the operation of the strut, and assuming a high rate pulse, fluid flows not only through the main orifice 20 but also through the pin nozzle 26 to the piston cylinder, since the growth of pressure in region 33 of the receiver cylinder and in the space of control unit 30 above valve disk 34 is too rapid to permit development of a counter-balancing pressure below the valve disk through the bleed orifice 39. As a consequence, valve disk 34 moves downward, opening the flow area between tube end 37 and the pin bottom and permitting fluid flow through the pin and nozzle. Since the sponge rubber 38 is a compressible material, the volume of rubber will become smaller or larger as the fluid pressure increases or decreases below the top end 37 of control unit 30. At the same time, fluid flows through the high frequency return orifices 51 from region 33 to the lower space 56 of snubber chamber 40 and past the outer edge of ring rim 62, thus developing pressure differences forcing the ring 46 rapidly upward against ring stop 47. This action allows the groove 49 to fill with fluid by flow in the clearance space between the ring 46 and the flange 22 as well as by upward flow through the bleed orifices 50.

Since a high rate pulse is involved, the compressive force in the snubber will be of short duration and on re-extension, the time delay caused by ring movement in the groove 49 will be relatively long, since the out flow through bleed orifices 50 will be slow. Consequently, ring 52 is prevented from quickly closing the return orifices 51 which rapidly evacuate the chamber, permitting re-extension in a brief time interval.

In the case of a vertical pulse of long duration, the bleed orifice 39 in the valve disk of control unit 30, at the base of the receiver cylinder, is able to supply sufficient fluid to the space below disk 34 to counterbalance, with the aid of spring 35, the increased downward pressure on the disk due to fluid compression in region 33, and, consequently, the tube head 37 holds the pin base opening closed. Accordingly maximum pressure is transmitted between the two strut cylinders.

In this snubber, for the case of the vertical pulse of long duration, the annular groove again fills on the compression movement. However, in this case, on the re-extension movement the greater pressure in space 55 of chamber 40 will force the ring to bottom in groove 49 in a relatively short time, at which time flow of fluid around the ring edge 52 would be stopped, the outlet flow being determined by the size of ring ducts 57, which are alined with return orifices 51. These restrictions to flow cause the pressure in the annular chamber 40 to increase to a large value, thus exerting a large vertical force between the main piston cylinder flange 22 and the upper receiver cylinder flange 44 of chamber 40 which acts to limit the rate of strut re-extension and thus snub the rebound.

A modified form of low band pass shock strut is illustrated in Figs. 4, 5, 6 and 7 in which the control unit for valvular control is placed in and attached to the piston cylinder 11. With this arrangement, it is possible to control the snubbing action by controlling the flow of fluids through the main piston orifice.

Figure 4:
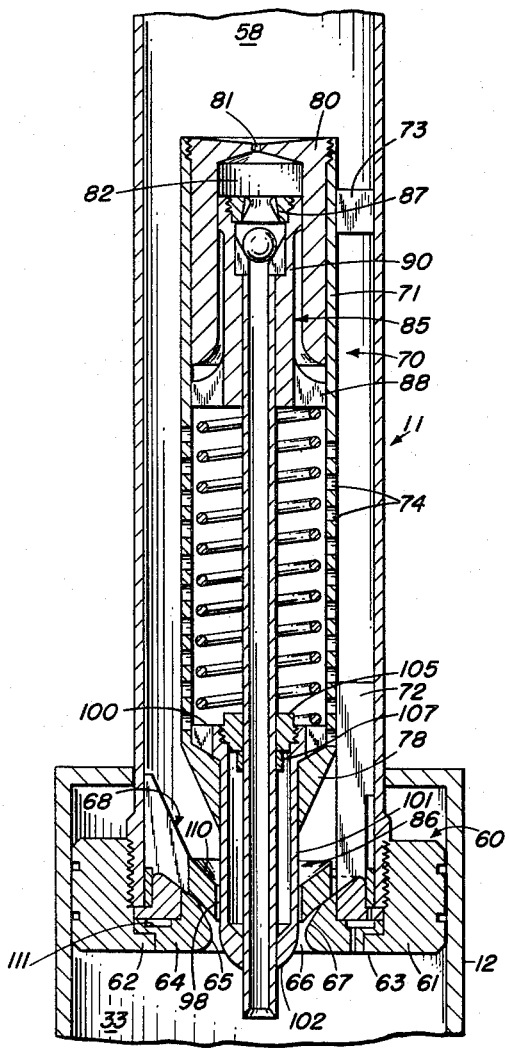
Fig. 4 is a sectional view, in elevation, of a modified form of shock absorber.

Referring to Fig. 4, the main piston, slidable in the receiver cylinder, is indicated at 60 and includes an outer ring 61 having an internal thread for threaded attachment to the base of piston cylinder 11, and an internal annular ridge 62 having a lower face 63 flush with the lower surface of ring 61. Supported on this ridge inside the lower section of the ring, is a main orifice plate 64, this plate having a large central opening with a reversely curved edge 65 forming the main piston aperture 66. The curved edge 65 of this main orifice is extended outwardly and upwardly from the line of maximum constriction, forming a flaring conical wall 67 for guiding fluid flow through the orifice and for serving as a lower support for the snubber unit 68.

Axially mounted inside the main piston cylinder is the control unit 70 in the form of an elongated cylindrical tube 71, supported at the base of cylinder 11 above orifice plate 64 by spaced spider plates 72 and at the top side by attachment plate 73. The lower half of this tube wall is perforated by openings 74 to permit free flow of fluid between the main piston region 58 and the tube interior. At its base, the tube is provided with an elongated bearing member 78, having an inner bearing surface, adapted to engage slidably a plunger, as will be described hereinbelow. The top end of the control tube 71 is closed by a thick walled member 80 in the shape of an inverted cup having a small pressure control orifice 81 at the base center for passage of fluid into the chamber 82 formed by the cup. The cup wall has a length about one third the control tube distance and is attached to the control tube by threads at the top end.

Within the control tube 71 are two piston units 85 and 86 positioned, respectively, at the upper and lower ends of this tube. The unit 85 is provided with two pistons numbered 90 and 88, piston 90 having sliding movement in contact with the inner face of cup member 80 and defining chamber 82 within the cup, and piston 88 having sliding movement in contact with the inner face of the control tube 71 below the open end of cup member 80, these pistons being joined by the tubular connecting rod 90. Piston 87 is centrally hollowed to form a check valve chamber 91 with downwardly contracting base spider walls forming seat 92 for check valve ball 93, upward movement of the ball being limited by a ring nut 94 screw-threaded to the top edge of valve chamber 91 and provided with a downwardly flared central aperture 95 forming a fluid passageway and an upper seat for ball 91. Small slotted bleed ducts 96 are formed axially on the sides of the aperture 95 to serve as bleed orifices. Piston 88 is provided with large vertical slots on its outer rim to allow free flow of fluid through it in a vertical direction. This piston serves as a guide to keep piston 87 aligned in cup member 80 and to receive the upper end of spring 108.

Piston unit 86 at the control tube base consists of a piston 100 having sliding engagement with the inner surface of the control tube 71 and a depending plunger 101 formed as a hollow elongated tube with the upper tube end attached to piston 100 and the lower tube end constricted by a smoothly rounded tip 102.

Figure 5:
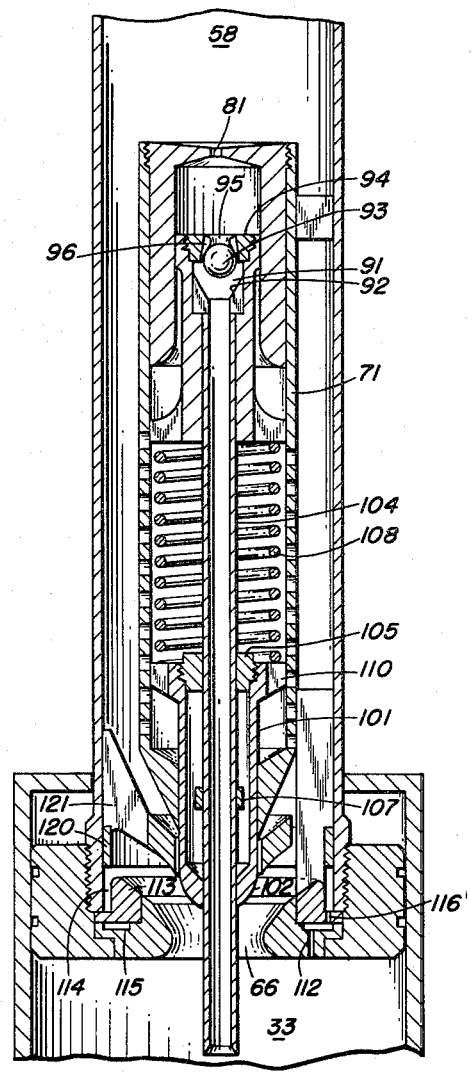
Fig. 5 is a sectional view of the absorber of Fig. 4 during a strut compression pulse having a high rate of application.

A tube 104 extends from the base of chamber 91 in piston unit 85 through the control tube center and openings formed in support nut 105 in piston 100 of the lower piston unit 86 and in the plunger tip 102, to a point below this tip. This tube is fixed to the upper connecting rod 90 but is free to slide through the lower piston unit 86, except as restrained by a flange 107 fixed to this tube. For example, as indicated in Fig. 5, the plunger moves freely upwardly from the point of contact of the piston support nut 105 and flange 107, as shown in Fig. 4. In the position of Fig. 4, the lower end of the plunger 101 rests at the point of maximum constriction of main orifice 66 in main piston 61, with the rounded tip extending below piston 61. It will be apparent, that as the plunger rises the curved tip cooperates with the main orifice wall to produce increasing flow areas through the orifice. A coil spring 108 normally maintains piston units 85 and 86 at opposite limits of the control piston 70.

The operation of the control unit of Fig. 4, follows. Under the influence of a slowly applied load the pressure in the lower cylinder 12, and thus in region 33, increases at a slow rate forcing fluid upward through the orifice 66 and tube 104 and moving ball 93 upwardly to close check valve 93, 95, except for leakage flow through bleed duct 96 into chamber 82 and out through tip orifice 81. Bleed duct 96 is so sized, in relation to orifice 81, that the pressure in chamber 82 is roughly the mean value between the pressure in cylinder regions 33 and 58 of the shock absorber cylinders; also, piston 87 is so sized with respect to plunger 101 that, under the influence of the mentioned slow pressure, the downward force on piston 87 is slightly larger than the upward force on plunger 101. Accordingly, as the pressure slowly increases in region 33 and at a still slower rate in chamber 82 in the control unit, piston 87 is forced downward, compressing spring 108 which, in turn, maintains plunger 101 at its bottom position as shown in Fig. 4.

Under the influence of a rapid rate of loading, fluid cannot flow rapidly through bleed duct 96 around piston check valve 93, 95, and, as a consequence, piston 87 is not forced downward with sufficient speed to maintain plunger 101 at its lower equilibrium point. Therefore, plunger 101 rises, as shown in Fig. 5, enlarging the annular flow area through main orifice 66, which, in turn, allows fluid to flow rapidly from the lower cylinder in region 33 into the region 58 of upper cylinder 11. Thus, the strut telescopes rapidly, developing only a small load between the coacting strut members.

When the load on the strut reverses, pressure in region 33 decreases and that in region 58, by virtue of the air pressure in the upper cylinder, remains high. Since the upper cylinder pressure is instantly communicated to the lower surface of pistons 87 and 88 and the upper surface of plunger piston 100 the two units tend to separate until stop 107 comes into contact with nut 105. Further, since the effective cross sectional area of piston 87 is roughly of the order of twice the effective cross sectional area of plunger 101, a large net upward force exists on piston 87 and this piston is, therefore, driven upwardly, pulling with it plunger 101 and rapidly emptying chamber 82 of cup member 80 into region 33 through open check valve 93, 95. By this action, the annular main orifice area 66 is again increased to its larger value, allowing the rapid flow of fluid from region 58 in the upper cylinder through main orifice 66 into the lower cylinder with a resultant rapid telescoping extension of the shock strut in preparation for the next cycle.

In the shock strut, as shown in Fig. 4 the snubber unit 68 includes a valve ring 110 loosely surrounding the plunger 101 to provide a leak passage 98 and formed with a cylindrical wall and a conical upper wall inclining downwardly to the ring aperture at the surface of plunger 101. The lower ring side is concavely curved to form with the annular surface 67 of the orifice plate 64 an entrance space for fluids, beneath the ring, for application of lifting pressure at this point.

The orifice plate top surface 67 extends upwardly and outwardly to a point about halfway between the plunger 101 and the inner wall of piston cylinder 11, at which point it turns abruptly and vertically downward for approximately half the plate thickness and then radially outward to engage the inner surface of main piston 61 beneath the end of piston cylinder 11. An annular wide, flat bottomed groove 111 is formed on the upper side of the outer radial extension of the main orifice plate, and one or more orifices 112 connect this groove to main cylinder region 33 through the orifice plate 64.

A second ring 113 is mounted above main orifice plate 64, this ring being so dimensioned as to fit snugly in the notched annular recess formed by the vertical and radial walls at the plate edge, an upper annular notch being formed, also, in this second ring by a vertical wall displaced from the control tube inner wall to obtain the annular lag cylinder 114 of relative small thickness, and by a horizontal edge wall underlying the lower end of main cylinder 11 and overlying the groove 111 to form small annular manifold, 115. One or more small bleed ducts 116 are formed in the horizontal edge wall connecting the lag cylinder 114 with the manifold 115.

A lag piston 120, in the shape of a short ring, is so dimensioned as to fit closely in the lag cylinder 114 and have sliding movement in and out of this cylinder. This piston is connected to the outer edge of valve ring 110 by a spider 121 constructed of a series of radial vertical plates so spaced as to alternate with the vertical plates 72 supporting the control tube 74. Thus, the valve ring 110, the lag piston 120 and the connecting spider move as a unit to form the snubber 68.

In the operation of this snubber it will be first assumed that a pulse with a high rate of compression is applied to the strut, lifting the plunger for rapid flow of fluid through main orifice 66, as shown in Fig. 5. This rapid fluid flow, drives upward the valve ring 110, thus lifting the lag piston 120 out of lag cylinder 114 and permitting this cylinder to fill with fluid. At the end of the initial strut pulse, the pressure in region 33 rapidly decreases and the direction of fluid flow through main orifice 66 reverses as described above, tending to force the snubber ring valve downward. (See Fig. 6.) However, the movement of the lag piston 120 in its cylinder is delayed by the outflow of fluid from the cylinder through ducts 112 and 116 and, hence, the strut is allowed to reextend in preparation for the next pulse cycle.

Figures 6, 7:
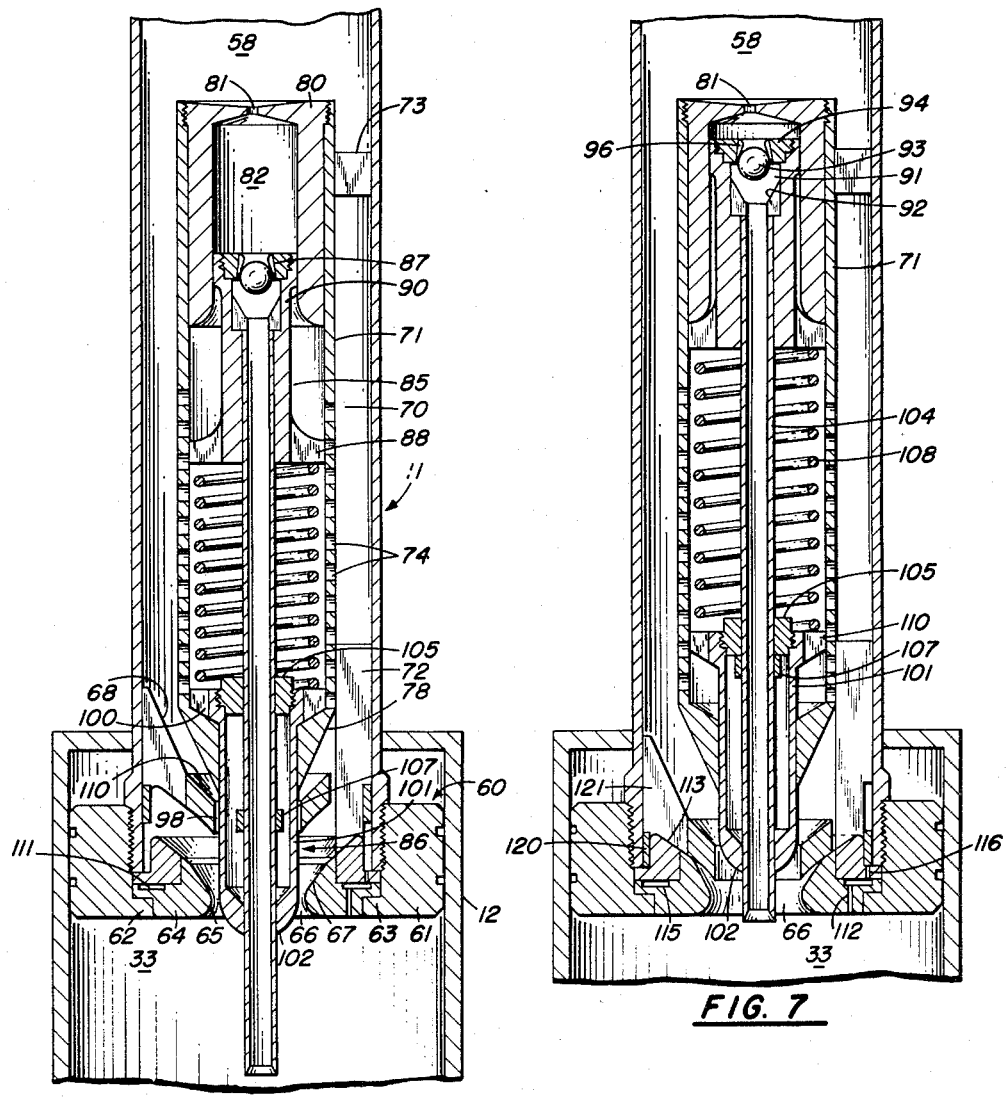
Fig. 6 is a view similar to that of Fig. 5, but representing conditions at the end of the pulse of Fig. 5.
Fig. 7 is a view similar to those of Figs. 4, 5 and 6 but showing valve conditions during a strut rebound from a slowly applied pulse or following the application of a rapid pulse superposed on a slow pulse.

In the case of a slow pulse, the initial pressure conditions are shown in Fig. 6, with the snubber shifted upwardly to release the lag piston 120 and permit filling of the lag cylinder 114 by fluid. On the rebound, the fluid is expelled from the lag cylinder and the snubber valve seats on the orifice plate 64, thereby blocking the main orifice. The valve relationship of Fig. 6 exists also following a rapid pulse superposed on a slow pulse.

From the above description, it will be apparent that the snubber valve ring blocks the main orifice passage 66 on the rebound regardless of whether the valve plunger 86 is in its up or down position, as shown in Figs. 4 and 7. The restricted fluid flow from region 58 to region 33 then occurs through passage 98 during the snubbing process.

Obviously many modifications and variations of the present invention are possible in the light of the above teachings. It is therefore to be understood that within the scope of the appended claims the invention may be practiced otherwise than as specifically described.

What is claimed is:

1. A snubber for shock absorbers comprising a piston cylinder having a head, a receiver cylinder in which said piston head has sliding movement, a flange projecting outwardly from the piston head into sliding engagement with the receiver cylinder, a flange projecting inwardly from the receiver cylinder edge to said piston cylinder to form a chamber with movable end walls, a series of larger orifices formed annularly through the outer section of said piston flange, a series of smaller orifices formed annularly through the inner section of said piston flange, an annular groove formed in the piston flange top above said smaller flange orifices, a ring surrounding said piston cylinder within said chamber and slidable into said groove, a stop on said piston cylinder for limiting upward movement of said ring at a point of clearance between the ring and groove wall, a radial rim projecting from the upper section of said ring to a point short of the receiver cylinder to form an edge passageway about the rim, and an annular series of bleed ducts around the outer section of said rim, said bleed ducts being coaxial with said larger orifices.

2. A shock absorber adapted for connection between two machine parts, comprising, a hollow cylinder forming a main piston connectable to one part, a hollow cylinder forming a receiver connectable to the other part, said piston having telescoping connection with said receiver, a main piston head having a main orifice therein at the compression end of said main piston, a hollow plunger positioned within one of said cylinders and operatively coupled therewith in substantially perpendicular relation to said main piston head, said plunger having a free end substantially concentrically positioned in said main orifice and having an outer diameter less than the diameter of said main orifice, the space between the wall of said main orifice and said plunger free end forming an annular flow area, a control unit mounted within said one cylinder contiguous to said hollow plunger and comprising a control cylinder having at least one piston slidably positioned therein, both sides of said control cylinder piston being effectively hydraulically coupled with the side of said main piston head exposed to receiver fluid pressure, means operative to maintain said control cylinder piston in an initial position within said control cylinder during an increase of fluid pressure within said receiver within a range of rates of increase of fluid pressure with respect to time having a preselected upper limit, said control cylinder piston being movable within said control cylinder in response to an increase of fluid pressure within said receiver at a rate higher than said preselected upper limit, said hollow plunger being operable upon movement of said control cylinder piston to increase the flow of fluid from the side of said main piston head exposed to receiver fluid pressure to the other side thereof, snubber means connected to said main piston and comprising an annular groove substantially rectangularly shaped in section provided on said other side of said main piston head; an annular element normally snugly seated in and substantially completely filling said groove; means connected to said annular element and positioned to partially obstruct at least one main piston head fluid passageway, said passageway obstructing means being proportioned to completely pass a slowly moving flow of fluid, but upon exposure to a rapid flow of fluid movable away from said main piston head to increase the effective area of said fluid flow passageway and to lift said annular element completely out of said circular groove to permit fluid to fill said groove, said annular groove when filled with fluid acting as a dashpot to prevent rapid reseating of said annular element in said annular groove upon the return stroke of said shock absorber following compression.

3. The shock absorber as defined in claim 2, wherein said annular groove comprises an annular cylinder having an outer wall coincident with the inner surface of said main piston and wherein said annular element comprises an annular piston movable within said annular cylinder for a part only of its range of movement, said fluid passageway obstructing means including a ring valve slidably surrounding said plunger and adjacent said main orifice within the piston cylinder, and said ring valve being coaxially disposed within said annular piston and rigidly connected thereto.

4. The shock absorber as defined in claim 2, said snubber means being operative only in the selected range of frequencies of force applications.

5. The shock absorber as defined in claim 4, said selected range of frequencies of force applications being adjacent the lower end of the frequency spectrum.

6. A shock absorber adapted for connection between two machine parts, comprising a hollow cylinder forming a main piston connectable to one part, a hollow cylinder forming a receiver connectable to the other part, said piston having telescoping connection with said receiver, a main piston head having a main orifice therein at the compression end of said main piston, a hollow plunger positioned within one of said cylinders and operatively coupled therewith in substantially perpendicular relation to said main piston head, said plunger having a free end substantially concentrically positioned in said main orifice and having an outer diameter less than the diameter of said main orifice, the space between the wall of said main orifice and said plunger free end forming an annular flow area, a control unit mounted within said one cylinder contiguous to said hollow plunger and comprising a control cylinder having at least one piston slidably positioned therein, both sides of said control cylinder piston being effectively hydraulically coupled with the side of said main piston head exposed to receiver fluid pressure, means operative to maintain said control cylinder piston in an initial position within said control cylinder during an increase of fluid pressure within said receiver within a range of rates of increase of fluid pressure with respect to time having a preselected upper limit, said control cylinder piston being movable within said control cylinder in response to an increase of fluid pressure within said receiver at a rate higher than said preselected upper limit, said hollow plunger being operable upon movement of said control cylinder piston to increase the flow of fluid from the side of said main piston head exposed to receiver fluid pressure to the other side thereof, snubber means comprising a slidable ring rectangular in cross-section surrounding said main piston adjacent the head end thereof, said ring having a radial rim adjacent the upper edge thereof provided with a bleed duct parallel to the main piston axis, a circular flange surrounding the head of said main piston, said flange slidably engaging the inner surface of said receiver cylinder, a series of larger orifices formed annularly through the outer section of said flange, a series of smaller orifices formed annularly through the inner section of said flange, an annular groove of substantially the same cross-section as said ring below said radial rim cut in the flange top beneath said slidable ring and adapted to receive the lower ring edge in piston-cylinder relationship, a stop on the outer surface of said main piston above said ring to limit upper movement thereof, and a chamber forming flange for said ring projecting inwardly from the upper end of the receiver cylinder to said main piston, said ring rim terminating short of said receiver cylinder to form an annular passageway about said ring and said ring bleed ducts being coaxial with said larger flange orifices.

References Cited in the file of this patent

UNITED STATES PATENTS

| | | |
|---|---|---|
| 2,084,320 | Coleman | June 22, 1937 |
| 2,095,112 | Wallace | Oct. 5, 1937 |
| 2,161,811 | Grebe | June 13, 1939 |
| 2,244,501 | Pierce | June 3, 1941 |
| 2,405,733 | Boldt | Aug. 13, 1946 |
| 2,465,680 | Focht | Mar. 29, 1949 |
| 2,570,362 | Mercier | Oct. 9, 1951 |
| 2,668,603 | Winslow | Feb. 9, 1954 |
| 2,735,674 | Smith et al. | Feb. 21, 1956 |
| 2,865,396 | Focht | Dec. 23, 1958 |
| 2,866,633 | Schnitzer | Dec. 30, 1958 |

FOREIGN PATENTS

| | | |
|---|---|---|
| 554,732 | Great Britain | July 16, 1943 |